United States Patent [19]
Snyders

[11] Patent Number: 5,982,996
[45] Date of Patent: Nov. 9, 1999

[54] MECHANISM FOR PRINTER DRIVER SWITCHING IN WINDOWS OPERATING SYSTEMS TO ALLOW DISTRIBUTION OF PRINT JOBS TO AN OUTPUT DEVICE FROM A SINGLE PRINT REQUEST WITHIN AN APPLICATION

[75] Inventor: Lawrence M. Snyders, Boise, Id.

[73] Assignee: Hewlett-Packard Company, Palo Alto, Calif.

[21] Appl. No.: 08/816,978

[22] Filed: Mar. 13, 1997

[51] Int. Cl.$^6$ ...................................................... G06F 15/00
[52] U.S. Cl. ........................................... 395/114; 395/112
[58] Field of Search ..................................... 395/114, 112, 395/116, 115, 117

[56] References Cited

U.S. PATENT DOCUMENTS

| | | | |
|---|---|---|---|
| 3,874,493 | 4/1975 | Boyd | 197/100 |
| 4,452,136 | 6/1984 | Boynton et al. | 101/93 |
| 5,414,812 | 5/1995 | Filip et al. | 395/200 |
| 5,602,974 | 2/1997 | Shaw et al. | 395/114 |
| 5,625,757 | 4/1997 | Kageyama et al. | 395/113 |
| 5,692,111 | 11/1997 | Marbry et al. | 395/114 |
| 5,799,159 | 8/1998 | Abe | 395/287 |

*Primary Examiner*—Leo H. Boudreau
*Assistant Examiner*—Bhavesh Mehta

[57] ABSTRACT

An information distributing apparatus for operating within a computer network environment. The information distributing apparatus includes a computer having an operating system and is configured to operate within the computer network environment. The apparatus has an application configured for running on the computer via the operating system, the application configured to generate a source job in the form of an intermediate file format comprising an output instruction file. The apparatus includes a print processor in the form of an intermediate executable code for operating on the output instruction file. The apparatus also includes at least one output device having an output device driver configured to convert the output instruction file to output instructions usable by the output device for producing output. The print processor is operable on the output instruction file to select the device driver of one of the at least one output device to render the output instruction file, and feed the output instruction file to the output device driver of one of the at least one output device. A corresponding method is also disclosed.

20 Claims, 9 Drawing Sheets

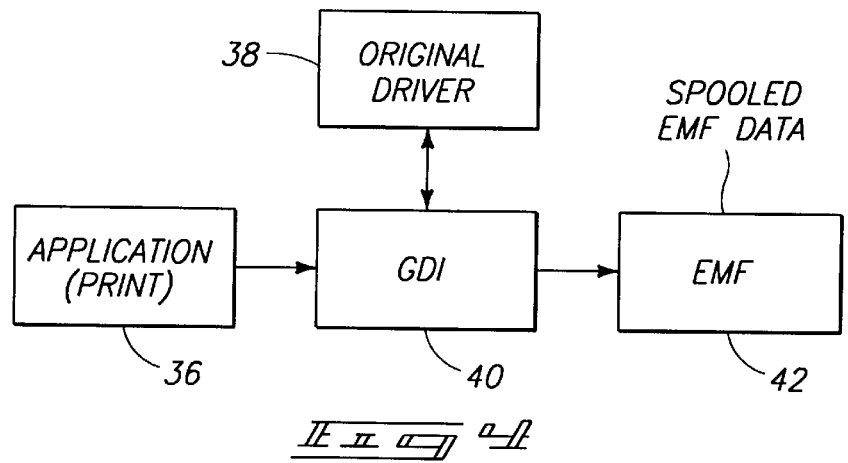
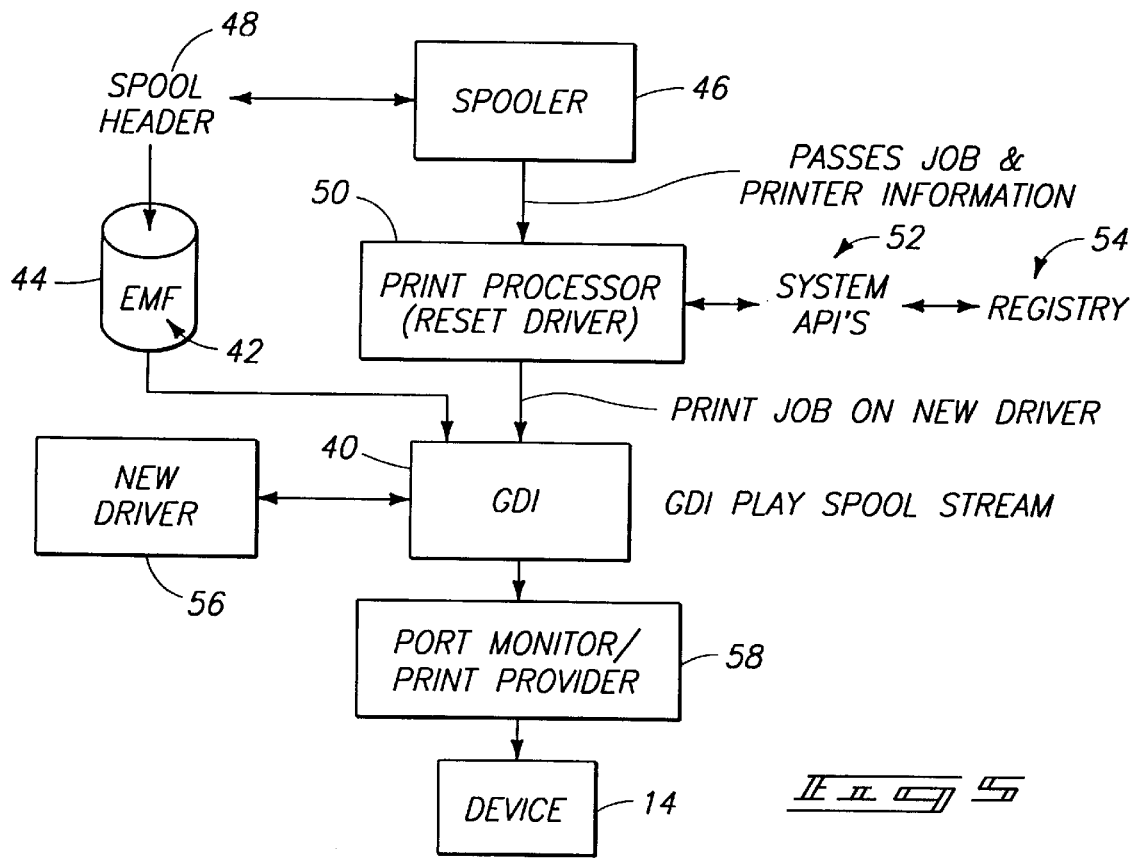

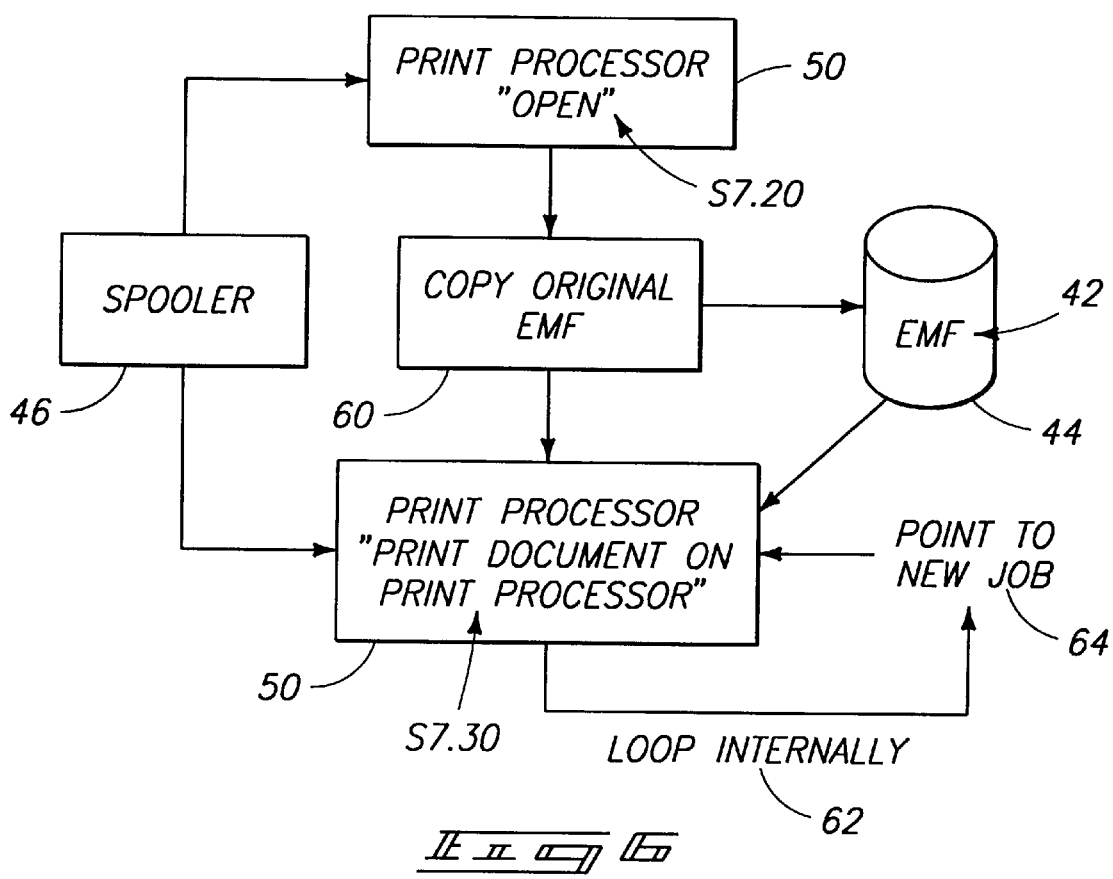

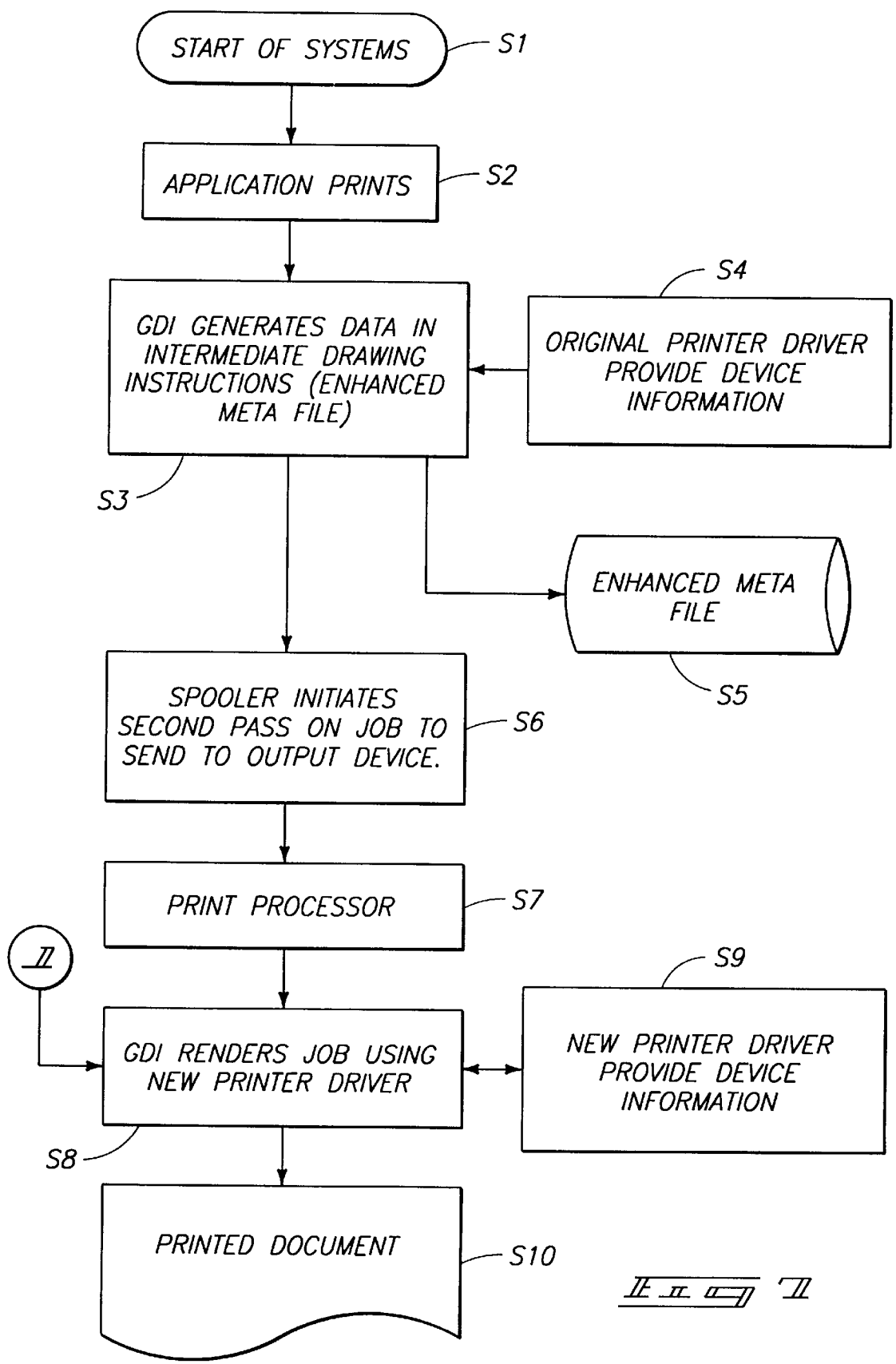

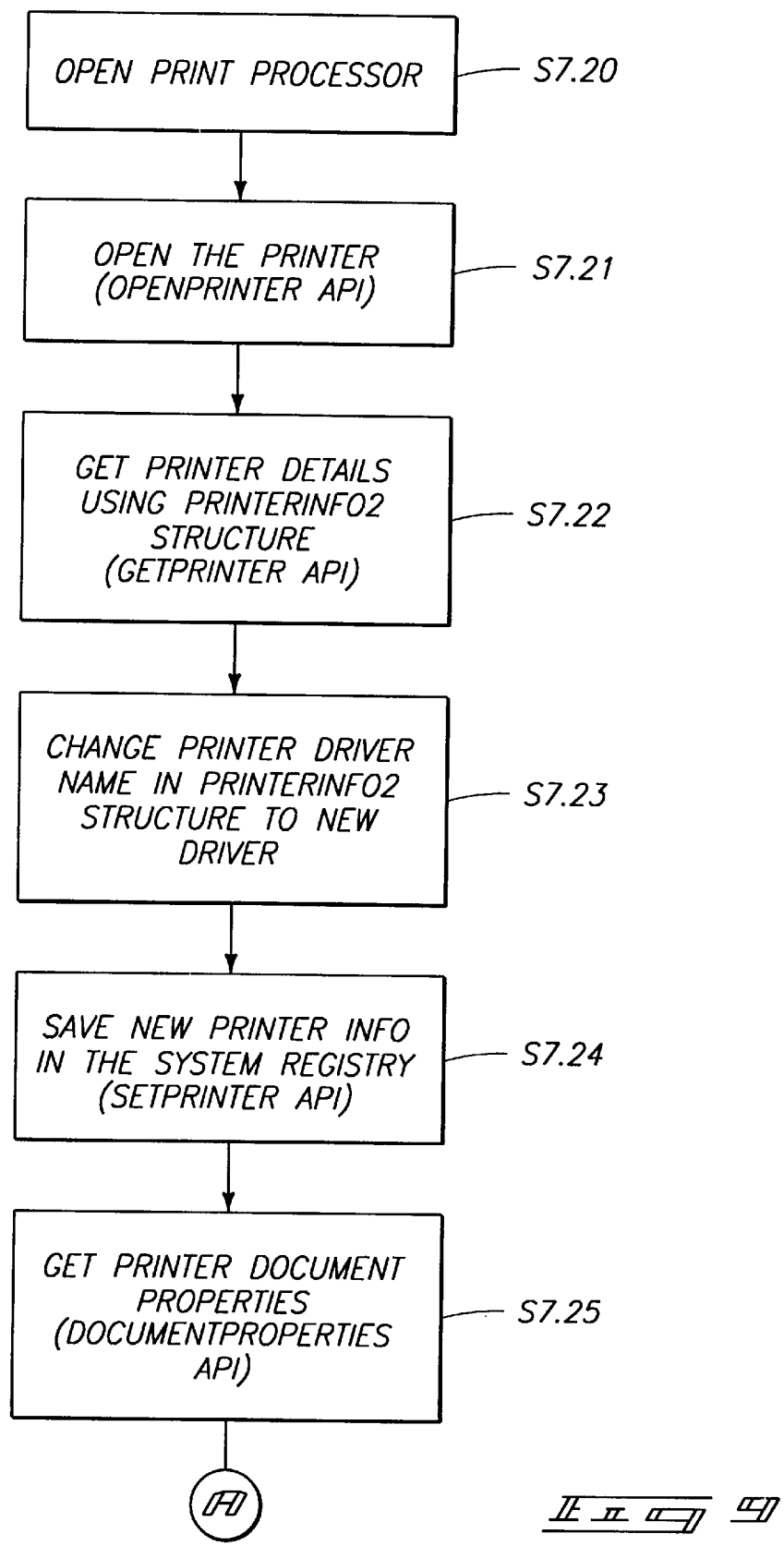

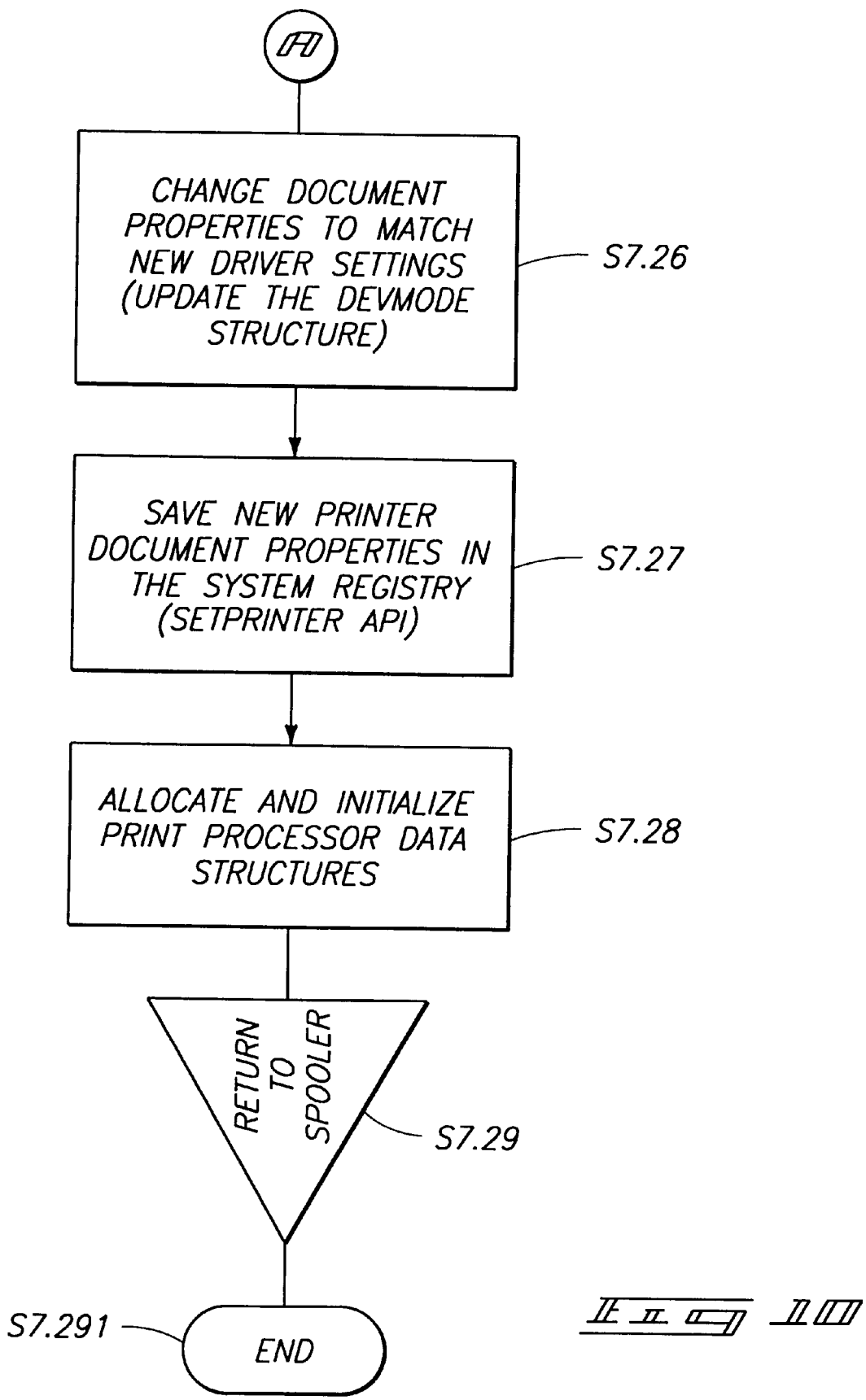

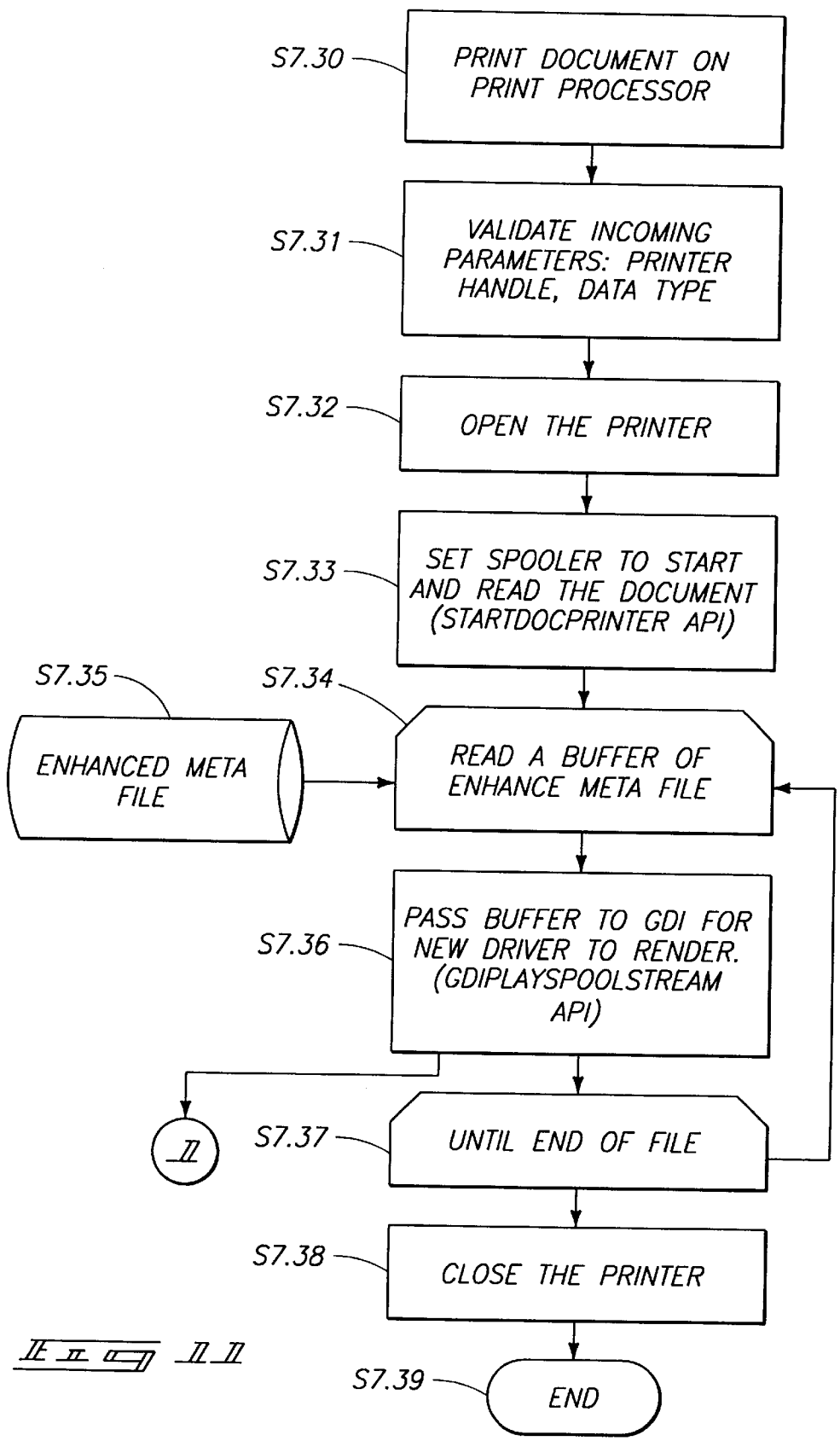

5,982,996

MECHANISM FOR PRINTER DRIVER SWITCHING IN WINDOWS OPERATING SYSTEMS TO ALLOW DISTRIBUTION OF PRINT JOBS TO AN OUTPUT DEVICE FROM A SINGLE PRINT REQUEST WITHIN AN APPLICATION

FIELD OF THE INVENTION

This invention relates to a system for print driver switching within a computer network environment such as a windows operating system to direct print jobs to one or more unlike devices from a single print request within an application.

BACKGROUND OF THE INVENTION

Centralized and decentralized computer networks are available with a wide variety of peripheral devices that are connected together so that they can communicate with each other. For applications requiring the output of data from a computer system, one or more output devices are provided in the form of a monitor, a printer, a disk drive, or other peripheral. For the case of computer networks, the number and variety of available output devices can be quite large, resulting in data transfer incompatibility problems.

One problem associated with current computer network environments is that they do not allow the automatic sending of electronic material from one application to unlike destinations from a single source application or document. For example, current window driver solutions do not allow an operator to automatically send a print job from a print driver to any one of several receiving devices, or printers. Instead, the operator must reconfigure the system to deliver output to a specific print driver of a selected output device.

With current window driver solutions, each printer forms an output device having a dedicated print engine requiring dedicated encoding for the associated print processor. For example, a print processor produces a file of drawing instructions for a configured printer. Normally, a permanent link is provided between the application (e.g., a word processor), the intermediate drawing file, and a single, dedicated output device. Optionally, the user can select one of several dedicated output devices via a windows-based menu. However, such a configuration is formatted for use with one output device which the user has selected, and remains dedicated to such device until it is manually reconfigured.

Therefore, a need exists for a system that distributes print jobs from a computer operating within a computer network environment to any one of several unlike output devices from a single print request within an application.

Another problem associated with current computer network environments is the inability to send originating source data multiple times to multiple output devices. For example, current window driver solutions do not allow an operator to automatically parse the source data multiple times to obtain the necessary encodings for each output device. Instead, the operator must reconfigure the system to perform each delivery of output to each specific print driver of each selected output device.

This invention relates to an information distributing apparatus and method which overcomes the above drawbacks. The information distributing apparatus of this invention improves distribution of source jobs for output to any one of multiple unlike output devices. The information distributing apparatus of this invention also improves distribution of source jobs to multiple receiving output devices form a single source application/document.

SUMMARY OF THE INVENTION

According to one aspect of this invention, the information distributing apparatus depicted generally in FIGS. 1–5 operates within a computer network environment. The information distributing apparatus includes a computer having an operating system and is configured to operate within the computer network environment. The apparatus has an application configured for running on the computer via the operating system, the application configured to generate a source job in the form of an intermediate file format comprising an output instruction file. The apparatus includes a print processor in the form of an intermediate executable code for operating on the output instruction file. The apparatus also includes at least one output device having an output device driver configured to convert the output instruction file to output instructions usable by the output device for producing output. The print processor is operable on the output instruction file to select the device driver of one of the at least one output device to render the output instruction file, and feed the output instruction file to the output device driver of one of the at least one output device.

According to another aspect of this invention, the information distributing apparatus depicted generally in FIGS. 1–5 implements a method for operating within a computer network environment. The method is implemented in a system for distributing print jobs from a computer usable for operating in a computer network environment of the type having an operating system; an application configured for running on the operating system and generating a source job comprising an output instruction file; and at least one output device having an output device driver for receiving the output instruction file for producing output. The method includes the steps of: providing a print processor in the form of an intermediate executable for operating on the output instruction file; retrieving printer details for an identified printer driver name from a memory location in a memory of the computer; changing the printer driver name in the memory to a different driver of a different printer; saving the printer details of the identified printer driver name in the form of new printer information in a system registry; retrieving printer document properties of the saved printer details from memory; changing the retrieved printer document properties to match new driver settings; saving the new printer document properties in the system registry; and allocating and initializing print processor data structures usable to execute a print job on the new printer.

Other objects, features and advantages will be apparent from the detailed description given below of the apparatus and method of this invention and embodiments of systems which incorporate the apparatus and method of this invention.

DESCRIPTION OF THE DRAWINGS

FIG. 4 is a schematic block diagram of a first embodiment of a device driver switching mechanism during a first pass operation from an original device/driver to spool enhanced metafile data to memory.

FIG. 5 is a schematic block diagram of a first embodiment of a device driver switching mechanism during a second pass operation for despooling print job and printer information via a print processor to a new device driver.

FIG. 6 is a schematic block diagram of a first embodiment of a device driver switching mechanism during a multiple pass print job distribution.

FIG. 7 is a flowchart illustrating the sequence of steps employed in automatically implementing a mechanism for printer driver switching in windows operating systems to allow distribution of print jobs to multiple unlike jobs within a print request within an application in one embodiment of the present invention.

FIGS. 9 and 10 illustrate a flowchart depicting a second operation implemented by the print processor of FIG. 7.

FIG. 11 is a flowchart illustrating a third operation implemented by the print processor of FIG. 7.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
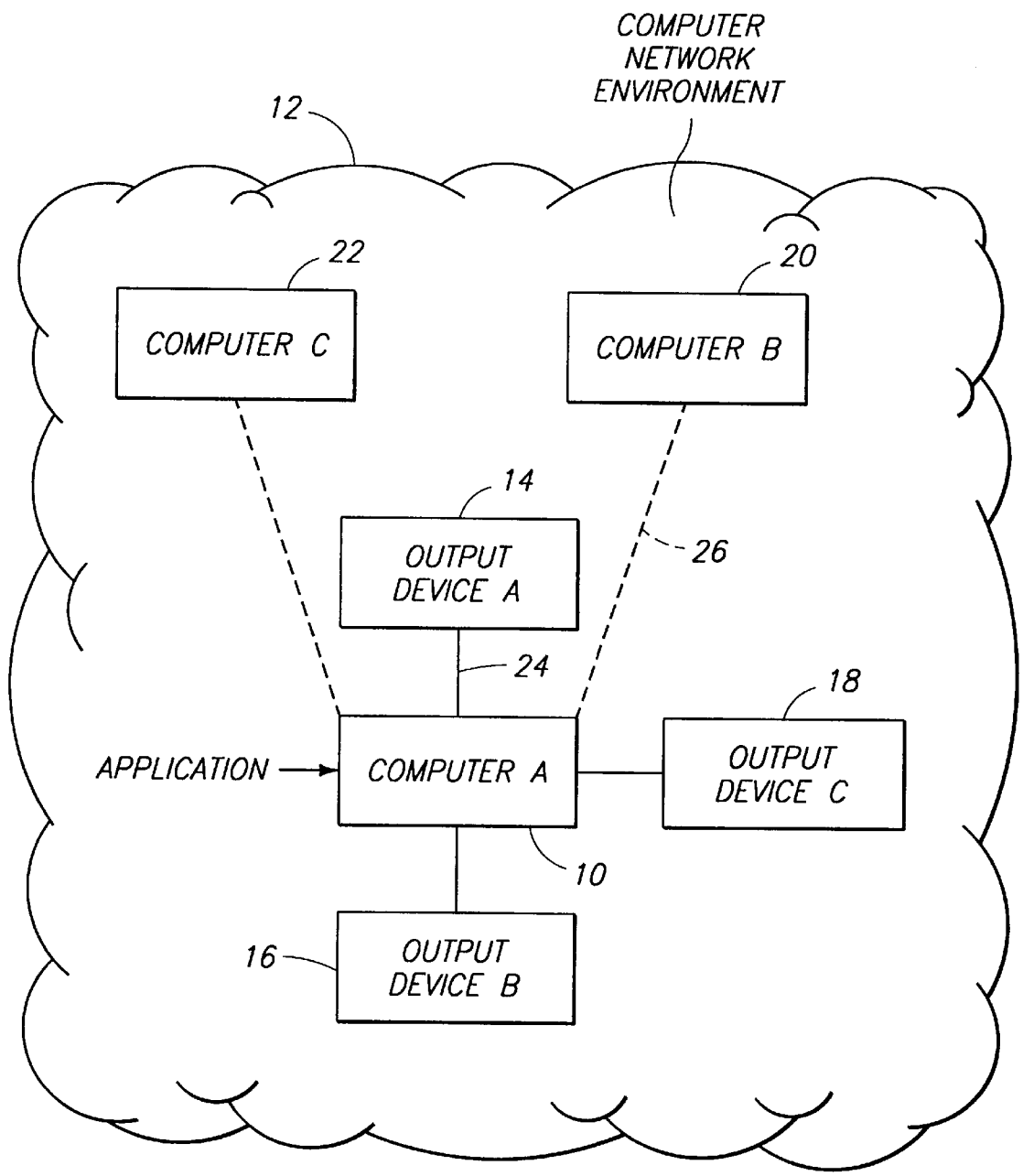
FIG. 1 is a conceptual block diagram of a computer network environment for implementing the printer driver switching mechanism and method of this invention, depicting one layout of a plurality of computers and output devices configured within the network environment in accordance with one embodiment of this invention.

FIG. 1 shows a computer 10, labelled "computer A", configured for distributing information within a computer network environment 12. Computer 10 is able to send electronic material in the form of a source document, or job to multiple receiving devices within the network environment. The source document is generated in response to an application being run on an operating system of computer 10. More particularly, a plurality of output devices 14, 16 and 18, labelled "output device A", "output device B", and "output device C", respectively, provide the receiving devices for receiving output instruction files and producing output. Additionally, computer 10 is linked with other computers 20 and 22 having similar associated output devices (not shown). Computer 10 is capable of sending a source document to any one of these output devices. Computer 10 is connected together, or linked for signal communication with each of output devices 14, 16 and 18 via a respective communications link 24. Similarly, computer 10 is connected together, or linked for signal communication with other computers 20 and 22 via a respective communications link 26. Links 24 and 26 can be formed from any of a number of presently available wire or wireless signal connections usable in forming computer network connections. One such connection is formed by hard wiring together respective components of network 12.

According to the network environment 12 depicted in FIG. 1, it is understood that output devices 14, 16 and 18 and computers 16, 20 and 22 have dedicated processors for performing processing and communications needs when transferring source jobs and output instructions between devices of the network. The computers 16, 20 and 22 have a Windows 95 operating system, and a custom print processor of this invention for use with Windows 95. The output devices 14, 16 and 18 have the same custom print processor, enabling printing directly from an application running on the operating system of computer 10 to any one of output devices 14, 16, or 18.

Computer 10 preferably contains a Windows 95 operating system. An "operating system" is a set of computer programs used specifically by a computer for managing its resources. The operating system controls all resources of the computer system, including communication between a user and the computer. Several exemplary operating systems include DOS, Windows, OS/2, UNIX, and the Macintosh System. Preferably, the Windows 95 operating system also includes the "Microsoft Windows 95 Device Driver Developers Kit" which can be obtained from Microsoft Corporation by ordering their "Microsoft Developer Network Professional Subscription". The mailing address is: Microsoft Developers Network, P.O. Box 5549, Pleasanton, Calif. 94566-1549. The "Microsoft Developer Network Professional Subscription" includes CDROMs with sample source code and documentation describing how to develop applications and device drivers. One component of the Driver Developers Kit (DDK) details how to develop print system components. A print processor is a print system component documented in the Driver Developers Kit. The subscription includes all documentation as to how to use the Developers Kit.

According to the implementation of this invention, an application is run on the operating system of computer 10, as shown in FIG. 1. An "application" is a computer program that is configured to assist in performing a certain type of work. In contrast, an operating system runs a computer, a utility performs maintenance or general-purpose chores, and a language is used to create computer programs. Based upon its particular design, an application can manipulate text, graphics, numbers, or a combination of these elements.

The operating system of computer 10 and network 12 includes an application programming interface (API). An API comprises a defined set of functions provided by the operating system for use by an application. The interface exists in the form of a defined set of functions for use where it is necessary for proprietary application programs to talk to communications software, or conform to protocols from another vendor's product. An API provides a standardized method of vertical communications within and outside of the network environment.

For the case where output devices 14, 16 and 18 are printers, each printer has a printer driver. A "printer driver" is a software program that enables other programs to work with a particular printer without concerning themselves with the specifics of the printer's hardware and internal language. Each printer requires a specific set of codes and commands to operate properly and to provide access to special features and abilities. Alternatively, where the output device is not a printer, the output device has a device driver that functions like a printer driver.

A "driver", as referred to in a device driver and a printer driver, is a program or subprogram that is written to control either a particular hardware device or another software routine. The term "driver" originated from the concept of harness race drivers or automobile drivers who put their steeds or cars through their paces in order to measure their capabilities. The most common examples of a hardware driver, one that controls hardware, are those that pertain to particular brands and models of printers attached to personal computers. For example, a specific printer driver allows a word processor to communicate with a particular model dot matrix printer or laser printer.

Another import aspect involves the need for software in the form of printer driver software for supporting output devices. Up to this point, only the mechanical aspects of a printer have been detailed. On another level, the problem is made more complex by the vast variety of printers, with all sorts of special features, produced by a wide variety of manufacturers.

In the early development of printers, the situation was fairly simple. The available printers responded to ASCII text and control characters. For each character sent to the printer, a letter was produced. Advancement to the next line of text was made by means of a carriage return and line feed character. If overprinting was needed for boldface effects, only a carriage return character was sent, and the line was reprinted. Typewriter-like printers were also available, which responded to a backspace character, so boldfacing and underlining were easily accomplished.

As printer technology advanced with the development of dot matrix printers, the capability for font changes and graphical options became feasible. The outcome of this advancement was that word processors needed a set of software for each available printer, as each manufacturer had its own ideas of which features might be useful, each manufacturer implemented them in a different way. With each new printer make or model, a new set of software, referred to as driver software, was needed. As a result, an awkward problem was produced for both the user of the word processor printer and word processor vendors.

As the need for more elaborate printing capabilities has grown, a number of solutions has arisen. The main problem has been deciding where to put the "intelligence" for the printing process. There are three choices:

1. In the word processor itself. The word processor becomes somewhat awkward to use unless a fast CPU and good interface are available. Among other things, this leads to a proprietary file format for the word processing document. It becomes awkward to move highly formatted documents between different platforms or word processors, unless a common data format can be used, such as RTF or DCA. If no common formatted data structure can be found, it may be possible to transfer the files in "generic" format, where a carriage return/line feed is used only at the end of a paragraph. It then becomes necessary to reformat the file.

2. In the printer. This leads to what are known as page description languages (PDLs). The most common of these is one known as PostScript. The printer contains a processor and program to interpret the commands contained in the PostScript output file. The PostScript output file is an ASCII text file that can be edited manually, if necessary. Other proprietary page description and control languages are also available, such as those in the Hewlett-Packard line of laser printers. The postscript implementation is activated by buying and installing a PostScript language chip for the printer.

3. Another alternative. A final alternative, intermediate to these two, is a typesetting program such as TeX that creates a file containing the typesetting commands. This file is then converted into a device-independent format that must be passed through a driver program for the particular printer.

In addition to placement of the intelligence, graphics support is implemented in two general ways:

1. Essentially a graphics "dump" of the word processing screen. Again, the necessary printer driver is needed for the printer being used. It is also possible to imbed the art within the document itself, such as in Microsoft Word.

2. An "encapsulated" PostScript file. This contains the code created by the drawing program in a format to be interpreted. An Encapsulated PostScript file can also contain a preview image of the picture in a raster format, such as TIFF, or vector format, such as a Windows metafile for simple but direct screen manipulation of the image.

Again, which method is chosen is a matter of personal preference, and the particular implementation available. For purposes of implementing Applicant's device and method of FIGS. 1–11, a custom print processor for use with an operating system such as Windows 95 is used with a printer driver for the operating system that supports creating Windows enhanced metafiles.

Figure 2:
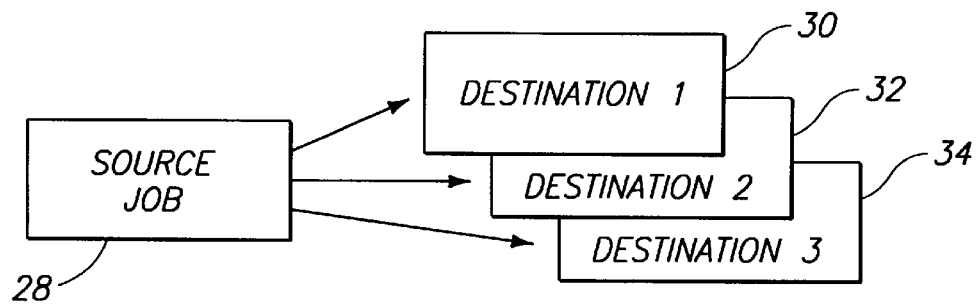
FIG. 2 is a schematic block diagram illustrating the structure and operation of the printer driver switching mechanism of FIG. 1, depicting multiple parsing of the originating document in a format for single thread spool delivery of a source job to multiple destinations.
Figure 3:
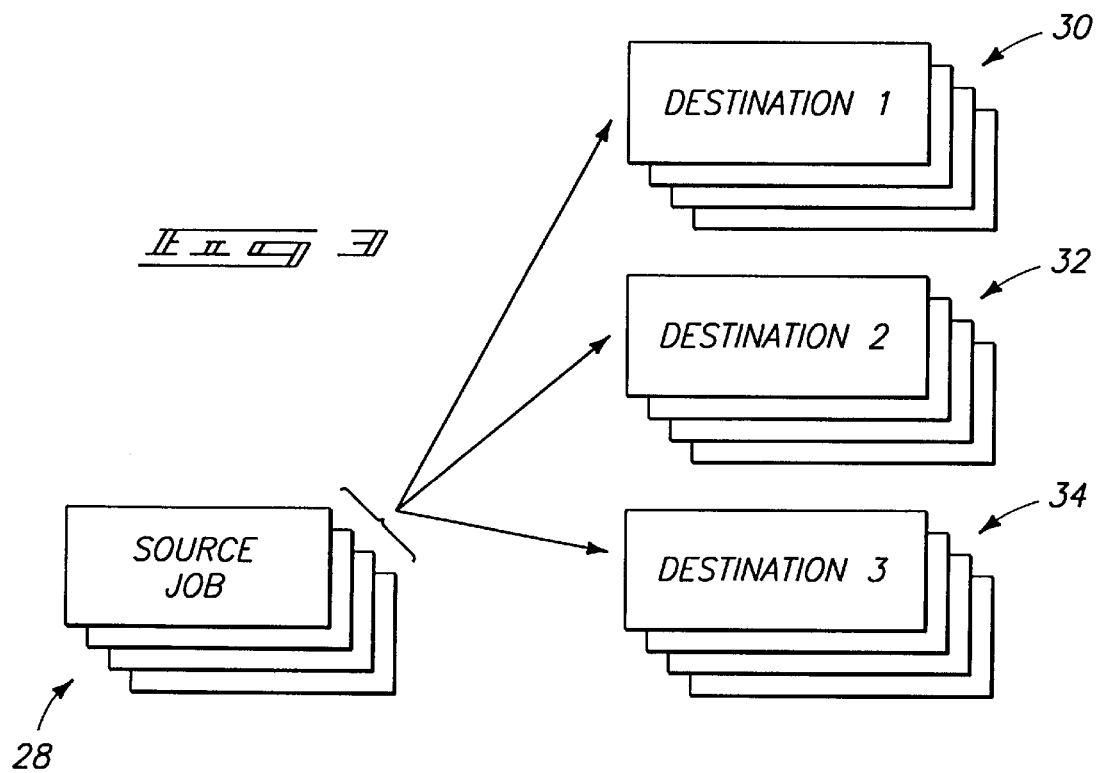
FIG. 3 is a schematic block diagram illustrating the structure and operation of the printer driver switching mechanism of FIG. 1, depicting multiple parsing of the originating document in a format for multiple thread spool delivery of a source job to multiple destinations.

FIGS. 2 and 3 illustrate ways for delivering a source job 28 to one or more destinations 30, 32 and 34, with one example of a destination being output devices 14, 16 and 18 (of FIG. 1). Another example of a destination could be computers 20 and 22. Current Windows driver solutions do not allow sending from one application to multiple destinations. However, the driver must be able to send electronic material to multiple receiving devices from a single source application/document in order to be effective. This requires saving the originating document data, or source job 28, in a format that can be parsed multiple times to obtain the desired encodings as shown in FIG. 2. If the source document, or source job 28, is multiple pages, then the mechanism to send must support sending all of a destination's pages before going to the next encoding type as shown in FIG. 3. A multi-thread delivery mechanism is necessary to implement the source job delivery to multiple destinations, as depicted in FIG. 3.

As shown in FIGS. 2 and 3, there exist multiple options for delivering a source job 28 to multiple destinations 30, 32, and 34. Following is a summary of the options for sending:

1) All pages of a job can be sent to a particular destination before delivery to other destinations. This option is referred to as serial delivery to one destination at a time via single-thread spool delivery. Current Windows driver architecture uses such single-thread spool delivery.

2) Delivery can be implemented one page at a time to each (all) destination(s) before going to the next page of the source job. However, problems may delay delivery, which means that it is often not a good delivery choice.

3) A thread can be provided for each destination (multiple-thread), with the entire job being delivered by each thread. In this manner, all threads can run simultaneously, resulting in parallel execution. This requires changing windows despooling mechanisms, but offers the best delivery to all receivers.

The implementation of an intermediate file format, preferably embodied in one form as an enhanced metafile (EMF), would allow the multiple passes necessary to implement the above-mentioned delivery features of FIGS. 2 and 3. However, an enhanced metafile is typically written to a memory via a spooler, and spooler play-back of an enhanced metafile does not allow multiple pass delivery from the memory. An enhanced metafile (EMF) is an enhanced file format that describes a series of graphical operations in a high-level, device-independent data format.

In order to implement such an intermediate file format, a custom print processor of Applicant's design will solve this problem by copying the enhanced metafiles. As will be shown and described below with reference to FIGS. 4–6, such a custom print processor will enable multiple passes to be delivered from memory via a spooler/despooler to deliver a source job to multiple destinations via the delivery schemes disclosed above with reference to FIGS. 2 and 3. A "spooler" is a component that takes application generated output intended for a printer and stores it temporarily on disk. A "despooler" is a system component responsible for data in spool files and handing it to the software responsible for writing it to an output device.

However, in order to do this, the device of this invention needs a dedicated spool job header file to describe the destinations and rendered encodings for each destination. When a Despool operation is implemented, Graphics Device Interface (GDI) sends graphical functions within a device context (DC) through the printer driver to the spooler. A "GDI" is a Graphics Device Interface (GDI), the component of Windows responsible for implementing the graphical functions such as line drawing and color management. GDI is a dynamic link library (DLL) that includes all of the graphical application program interfaces (APIs) in Windows. A device context (DC) is a GDI data structure that describes the current state of a device or drawing surface, a logical object found at the application level. More specifically, a device context is a structure maintained internally in GDI for the purpose of displaying the graphical data (painting on the screen, or printing pages). Any application developer who deals with printing is familiar with the concept of a device context. A dynamic link library (DLL) is a library of shared functions that applications link to at runtime, as opposed to compile time. A single in-memory copy of the dynamic link library (DLL) satisfies requests from all callers.

For source documents that are only one page in length, it is possible to alternatively use raw data formatted into the printer's language instead of the enhanced metafile (EMF). However, in this case it is necessary that all destinations support and choose the same encoding. In order to do this, support of the enhanced metafile is flagged in GDIINFO structure.

The apparatus and method of this invention deliver data to devices, including output devices such as printers, scanners and plotters, in a distribution list. The distribution list is a list of devices that may receive output. A distribution list may be controlled by a separate application, with which the print processor communicates. The separate application could be on any of a number of devices present within a computer network environment. The print processor then uses the list of devices when implementing operation of driver switching according to the device and method of this invention.

Applicant has tested the operation of driver switching according to this invention by running the program and file provided in Table 1, below. Further details of the implementation will be discussed below with reference to FIGS. 4–6, and the flowchart of FIGS. 7–11. Applicant ran such test on a Windows 95 system. An EMF job was put in a queue with 5 drivers, then the drivers were switched through a user interface (UI) to a bitmap driver. The resulting source job was processed, switched, and released, with the print job properly printing to a file.

The C code program listed below in Table 1 provides a "Custom Print Processor for Driver Switching" according to this invention. This code, as detailed in the flowcharts of FIGS. 7–11, enables the switching of components in the form of output devices for receiving a print job. The switching of components is implemented via a custom print processor for Windows 95, a driver that creates a windows bitmap, and a driver that creates HP PCL5 printer language. In order to do this effectively, a printer driver for Windows 95 or NT must support creating Windows Enhanced Meta Files (EMFs). An operator need only run a windows application, selecting the desired print object, with the desired initial printer driver. However, this driver must have the custom print processor associated with it. The operator, or network via some prioritization scheme, can then print the print job directly from the application. The resulting print job is stored temporarily in the spooler. When the job is scheduled to print, the spooler invokes the custom print processor to print the job. The print processor queries the system to determine if the drivers exist. It then opens the printer selected by the application and gets the current PRINTER.INFO.2 structure to get the driver name and other information about the printer.

The print processor then changes the driver name to the new desired name by using "SetPrinter API" with the PRINTER.INFO.2 structure and a new driver name field. Then using "Document Properties", the print processor gets the new driver's DEVMODE structure so it will be used and understood by the new driver. This is also saved on the PRINTER.INFO.2 structure. The above is all done when the print processor is instructed to "open the processor" by the spooler. The processor then gets called by the spooler to process the data. The processor calls the graphics device interface (GDI) to process the enhanced metafile (EMF) data in the new driver. At the end of the job, the driver is reset to the original so the user is always presented with the same information.

In order to implement the above process, several constraints need to be applied. First, the DEVMODE for any driver used cannot rely on private DEVMODE data, unless all drivers support the same private data as it is included in the enhanced metafile (EMF) job. Secondly, the user interface for all drivers should look the same, because the user could be invoked anytime.

In order to better understand driver switching according to the apparatus and method of this invention, a step-by-step flow through the system as implemented via the algorithm of Table 1 will be reviewed with reference to FIGS. 4–6. A basic benefit of the driver switching according to this invention is to allow a system choice of a different printer driver than the one used to create a print job in Windows 95 or NT (this applies to the OS/2 Queue Processor (queue driver) in concept as well). Choosing a different driver allows the single-spooled job to be sent to multiple unlike devices such as an HP Desk Jet printer, a LaserJet printer or a Plotter. It can also be processed multiple times to send to a distribution of devices, such as networked printers or Internet devices.

An analysis of the driver switching job flow illustrated in FIGS. 4–6 begins with a first pass print request that is initiated via an application 36. Application 36 produces a print job, or source job, that is delivered to the dynamic link library (DLL) of a graphics device interface (GDI). The graphics device interface (GDI) implements shared functions at link time between the application 36 and an original driver 38. The graphics device interface (GDI) contains all of the graphical application program interfaces (APIs) in Windows, producing spooled data in the form of an enhanced metafile 42.

According to a second pass operation of the driver switching, FIG. 5 illustrates spooler 46 which directs via a spool header 48 the storage and retrieval of the spooled print data, or enhanced metafile 42, from memory device 44. Spooler 46 passes print job and printer information to the custom print processor 50 of this invention. More particularly, the print processor 50 via the code implementation of Table 1 and FIGS. 7–11 resets the driver from the original driver 38 (of FIG. 4). A registry 54 stores hardware and software configuration information that is retrieved and used by the system application program interfaces (APIs) to assist the print processor 50 in resetting the driver. The print processor 50 directs the graphics device interface (GDI) to deliver the print job on a new, or reset driver. The enhanced metafile (EMF) 42 is retrieved from memory device 44 by the graphics device interface (GDI) to form part of the "GDI play spool stream". The graphics device interface (GDI) directs communication with the new driver 56 and a port monitor/print provider 58 of an output device 14. Device 14 subsequently receives output instructions from driver 56, which are converted from the output instruction file comprising a drawing instruction file containing drawing instructions that is received from print processor 50. Print processor 50 feeds the output instruction file to the output device driver 56 based upon a prioritization scheme.

One suitable prioritization scheme involves directing the output instruction file from print processor 50 to one of the at least one output devices based upon the print capabilities of the output device 14. Another way is to base directing the output instruction file to an output device based upon the relative availability of the output device 14 and/or the related device driver 56. For example, a particular driver 56 and printer 14 might contain too many print jobs already in queue. Alternatively, the driver 56 and printer 14 might be out of paper or ink. Even further, the particular driver 56 and printer 14 might not have desired print capabilities such as color, correct sized paper, image resolution, etc., making it more sensible to have processor 50 to deliver the print job to another more suitable driver and device, base upon one or any of a number of known prioritization schemes.

Considering a particular driver 56 and device 14 being used, how each method works depends on the printer driver used by the word processor. A driver is an extension to the operating system and is tailored to a specific piece of hardware, such as a Hewlett-Packard LaserJet III printer or a super VGA display. The printer driver takes the information provided by the in-line stream of data or the page description language and converts it into low-level commands recognized by the printer. (A screen driver does the same with the video adapter to display text on the monitor.) By working with different drivers, a word processor can work with the same document on a variety of displays and printers. A "registry" is a structured file in Windows that stores indexed information describing the host system's hardware, user preferences, and other configurations data. The registry serves to reduce the proliferation of configuration files that can plague a Windows machine.

FIG. 6 illustrates driver switching for distributing multiple pass jobs to one or more output devices. Print processor 50 is "opened" by spooler 46, according to Step "S7.20" described below with reference to FIG. 9, in order to copy the original enhanced metafile (EMF) 42 which is stored in memory device 44. Spooler 46 also directs the print processor to print the document on the print processor, via block 50, and Step "S7.30 of FIG. 11. Operation block 50 implements a closed loop 62 that points to a new print job 64, and retrieves and rewrites to memory 44 the enhanced metafile 42, which is re-retrieved via the print processor of delivery to each of a series of output devices according to loop 62 and pointer 64.

Logic Flow Diagram

According to FIG. 7, a "print processor" is disclosed as a first level logic flow diagram for the programming of a computer for operating within a computer network environment to render print jobs to multiple output devices. Table 1 further details the implementation of the print processor rendered in C-code language, as shown above with reference to FIGS. 5 and 6. The "print processor" forms a device that implements printer driver switching for use with a computer operating within a computer network environment. The "print processor" can be implemented automatically, according to the logic flow diagram of FIGS. 7–11. Alternatively, the custom print processor can create HP PCL5. In this manner, the print processor supports the creating of Windows Enhanced Meta Files (EMFs). A user runs a windows application, selecting a desired print object, with a desired initial printer driver. The device drivers operating in the computer network environment must have the custom print processor associated with them. Print jobs are printed from the application. The resulting print job is temporarily stored via the spooler in memory. When the job is scheduled to print, the spooler invokes the custom print processor to print the job. The print processor queries the system to determine if the drivers exist. It then opens the printer selected by the application and gets the current PRINTER.INFO.2 structure to get the driver name and other information about the printer. The print processor then changes the driver name to a new desired name as previously disclosed.

According to Step "S1", the operating systems on the computers within the computer operating network, and the operating systems and device drivers of the output devices are started. For example, upon powering up each device in the network, the system BIOS starts the operating system and spooler which can be used to automatically initialize, or trigger the initiation of the flowchart of FIGS. 7 and 8, which causes the computer to create an enhanced metafile, collect original printer drive device information, and switch the printer (or output device) for receiving the metafile. After performing Step "S1", the process proceeds to Step "S2".

In Step "S2", the application running on the operating system initiates a print job. One way is to automatically generate a print request. Another way is for a user to request a print job. After performing Step "S2", the process proceeds to Step "S3".

In Step "S3", the application running on the operating system forwards the print job to the Graphics Device Interface (GDI), a component of the Windows operating system responsible for implementing the graphical functions such as line drawing and color management. The GDI generates data in intermediate drawing instructions in the form of enhanced metafiles. After performing Step "S3", the process proceeds to Step "S6".

In Step "S4", the original printer driver provides device information necessary to operate the associated peripheral device such as a printer, a monitor, or other output device. The printer driver provides information about capabilities of the device that it represents. For example, the size of paper being used, support of colors, monochrome, etc. are some of the information about device capabilities that can be provided. After performing steps "S4" and "S5", the process proceeds to Steps "S5" and "S6".

In Step "S5", the GDI transfers the generated intermediate drawing instructions in the form of an enhanced metafile where it is stored in memory.

In Step "S6", the process directs the spooler to initiate a second pass on the print job in order to send the memory stored print job to an output device, as determined by the application. After performing step "S6", the process proceeds to Step "S7".

In Step "S7", the process initiates implementation of the print processor. The print processor is implemented in one of three ways: the print processor is initialized via operation of the flowchart depicted in FIG. 8; the print processor is opened, printer driver details are retrieved, and new printer drive settings are saved in the system registry to achieve print processor data structure; and the print processor carries out the printing (or output) of a print job on the new output device via an associated device driver. After performing Step "S7" (one of the routines of FIGS. 8, 9 and 10 collectively, or 11), the process proceeds to Step "S8".

In Step "S8", the GDI renders the print job using a new printer driver. After performing Step "S8", the process proceeds to Step "S10". Encircle numeral 1 connects with Step "S7.36" for passing a buffer to GDI, according to the operations of FIG. 11. After performing Step "S8", the process proceeds to Step "S10".

In Step "S9", the new printer driver, selected by the application, provides output device information to GDI, enabling the GDI to render the print job to enabling output of the print job via step "S10".

In Step "S10", the print job is printed as a document. At this point, the process terminates.

Figure 8B:
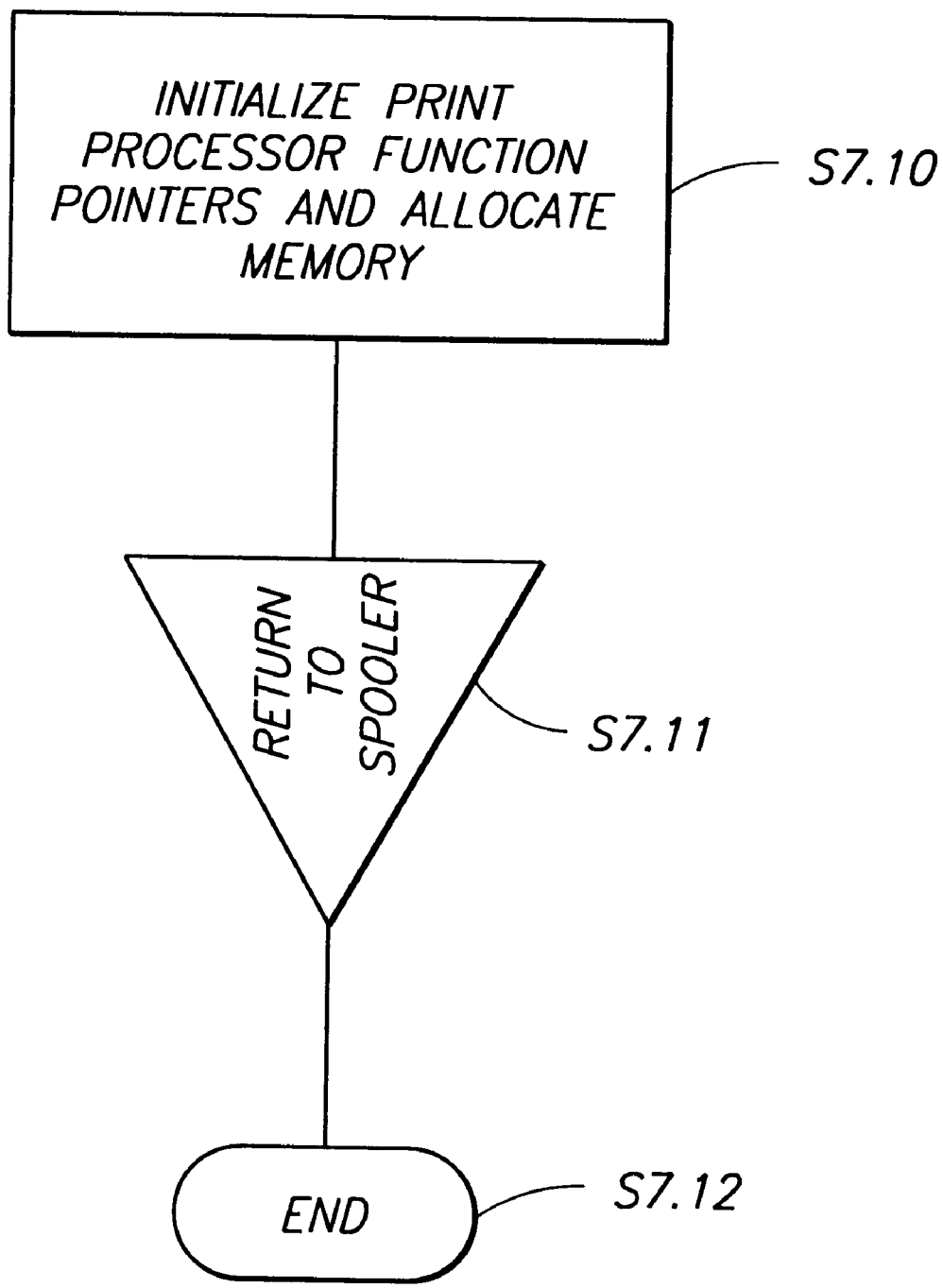
FIG. 8 is a flowchart illustrating a first operation implemented by the print processor of FIG. 7.

According to FIG. 8, the print processor implements a first operation. According to Step "S7.10", the process initializes the print processor function pointers and allocates memory. After performing Step "S7.10", the process proceeds to Step "S7.11".

In Step "S7.11", the print processor implements a first operation. According to step "S7.10", the process initializes the print processor function pointers and allocates memory. After performing Step "S7.10", the process proceeds to Step "S7.11".

In Step "S7.11", the process initiates return to the spooler. After performing Step "S7.11", the process proceeds to Step "S7.12".

In Step "S7.12", the process ends. The process then proceeds to implementation of the flowchart of FIGS. 9 and 10.

According to the process of FIGS. 9 and 10, the process implements a second operation by the print processor. According to Step "S7.20", the process opens the print processor. After performing Step "S7.20", the process proceeds to Step "S7.21".

In Step "S7.21", the print processor opens the printer. According to Step "S7.10", the process initiates the opening via "openprinter API". "Openprinter API" is the name of the subroutine that the print processor calls in the "Microsoft Windows 95 Device Driver Developers Kit". The "openprinter API" exists in the spooler to perform functions required by the spooler. After performing Step "S7.21", the process proceeds to Step "S7.22".

In Step "S7.22", the print processor retrieves printer details using "printerinfo2 structure". According to Step "S7.22", the details are retrieved via "getprinter API". "Getprinter API" is the name of a subroutine in the spooler that retrieves information from the spooler. After performing Step "S7.22", the process proceeds to Step "S7.23".

In Step "S7.23", the print processor changes the printer driver name in "printinfo2" structure to a new device driver. After performing Step "S7.23", the process proceeds to Step "S7.24".

In Step "S7.24", the print processor saves the new printer information in the system registry. Such is implemented via "setprinter API". "Setprinter API" is a subroutine that exists in the spooler that saves information about the printer, or output device, so that the spooler has knowledge of the information. After performing Step "S7.24", the process proceeds to Step "S7.25".

In Step "S7.25", the print processor retrieves the printer document properties. The retrieval is implemented as "documentproperties API". "Documentproperties API" obtains information from the spooler about documents being generated. After performing Step "S7.25", the process proceeds to Step "S7.26".

In Step "S7.26", the print processor changes the document properties to match new driver settings. The print processor essentially updates the devmode structure. "Devmode structure" is structure that exists in the spooler that describes the capabilities of the printer drivers available within the computer network environment. After performing Step "S7.26", the process proceeds to Step "S7.27".

In Step "S7.27", the print processor saves the new printer document properties in the system registry. To do this, the print processor changes the driver name to the new desired name by using "setprinter API". "Setprinter API" is a subroutine that exists in the spooler that saves information about the printer, or output device, so that the spooler has knowledge of the information. After performing Step "S7.27", the process proceeds to Step "S7.28".

In Step "S7.28", the print processor allocates and initializes print processor data structures. After performing Step "S7.28", the process proceeds to Step "S7.29".

In Step "S7.29", the print processor initiates a return to the spooler. After performing Step "S7.29", the process proceeds to Step "S7.291".

In Step "S7.291", the print processor ends the subroutine of FIGS. 9 and 10, preferably moving on to implementation of the subroutine of FIG. 11.

According to the process of FIG. 11, the process implements a third operation by the print processor. According to Step "S7.30", the process prints a document from the enhanced metafile. More particularly, the spooler directs a print document onto the print processor. After performing Step "S7.30", the process proceeds to Step "S7.31".

In Step "S7.31", the print processor validates incoming parameters. For example, the print processor validates the printer handle and the data type. After performing Step "S7.31", the process proceeds to Step "S7.32".

In Step "S7.32", the print processor opens the printer. After performing Step "S7.32", the process proceeds to Step "S7.33".

In Step "S7.33", the print processor sets the spooler to start, and reads the document. More particularly, the "startdocprinter API" file is implemented. "Startdocprinter API" is a function that exists in the print processor that in turn is called by the spooler to indicate the start of a document to the print processor. After performing Step "S7.33", the process proceeds to Step "S7.34".

In Step "S7.34", the print processor reads a buffer of an enhanced metafile. After performing Step "S7.34", the process proceeds to Step "S7.36".

In Step "S7.35", the print processor transfers the enhanced metafile to a buffer where it is read. After performing Step "S7.35", the process proceeds to Step "S7.36".

In Step "S7.36", the print processor passes the buffer to the GDI for the new driver to render. The "GDIplayspoolstream API" file is implemented. "GDIplayspoolstream API" is a subroutine that exists in the GDI. After performing Step "S7.36", the process proceeds to Step "S7.37".

In Step "S7.37", the print processor proceeds until reaching the end of the file. After performing Step "S7.37", the process proceeds to Step "S7.38".

In Step "S7.38", the print processor closes the printer. After performing Step "S7.38", the process proceeds to Step "S7.39".

In Step "S7.39", the print process ends the subroutine of FIG. 11, returning back to implementation of the subroutine of FIG. 7.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

22

TABLE 1

/* The following code is based on sample print processor provided by Microsoft
Corporation in their Windows 95 Device Driver Developer Kit. The sample code
is assumed to be freely available for modification and adaptation as necessary
by device manufactures for devices to be used on the Microsoft Windows
Operating System. Modification made to test the idea of PRINTER DRIVER
SWITCHING are noted below with the following comment before and after the
modification. The Microsoft copyright statement below does not apply to code
within the comments. */

/* >> Modification to test Printer Driver Switching. Begin/End << */
/*** >> L. Snyders 8/29/96 Copyright 1996 Hewlett-Packard Company <<
***/

```
/****************************************************************
 *                                                               *
 * THIS CODE AND INFORMATION IS PROVIDED "AS IS" WITHOUT
 WARRANTY OF ANY KIND, EITHER EXPRESSED OR IMPLIED, INCLUDING BUT
 NOT LIMITED TO THE IMPLIED WARRANTIES OF MERCHANTABILITY AND/OR
 FITNESS FOR A PARTICULAR PURPOSE. *
 *                                                               *
 * Copyright (C) 1993-95  Microsoft Corporation.  All Rights Reserved. *
 *                                                               *
 ****************************************************************/ define TIMING include <windows.h>
include <wingdi.h>
#include <winspool.h>
#include <winsplp.h>
#include <winuser.h>
include <winbase.h> include "local.h"
include "winprint.h"

TCHAR FAR *szWinPrint = TEXT("WinPrint");
LPTSTR  Datatypes[]={"RAW", "EMF", 0};
LPTSTR  pSimple = NULL;
LPTSTR  pFull = NULL;
```

*Case 10961135-1*

23

```
/*** >> Modification to test Printer Driver Switching. Begin << ***/
/*** >> L. Snyders 8/29/96 Copyright 1996 Hewlett-Packard Company <<
***/

LPTSTR pNewPrinterName = NULL;
LPDEVMODE pDevMode = NULL;

/*** >> Modification to test Printer Driver Switching. End << ***/
/* >> L. Snyders 8/29/96 << */

HDC WINAPI gdiPlaySpoolStream(LPSTR, LPSTR, LPSTR, DWORD, LPDWORD,
HDC);

#define PRINTPROCESSOR_TYPE_RAW    0
#define PRINTPROCESSOR_TYPE_EMF    1
define PRINTPROCESSOR_TYPE_NUM    2 ifdef TIMING
HWND hWndBench = 0;
#endif

// ------------------------------------------------------------------------
//
// ------------------------------------------------------------------------
BOOL
WINAPI
InitializePrintProcessor (
    LPPRINTPROCESSOR    pPrintProcessor,
    DWORD               cbPrintProcessor
)
{
    char szBuf[MAX_PATH];

pPrintProcessor->fpEnumDatatypes =
WinprintEnumPrintProcessorDatatypes;
    pPrintProcessor->fpOpenPrintProcessor = WinprintOpenPrintProcessor;
    pPrintProcessor->fpPrintDocument =
WinprintPrintDocumentOnPrintProcessor;
    pPrintProcessor->fpClosePrintProcessor = WinprintClosePrintProcessor;
    pPrintProcessor->fpControlPrintProcessor = WinprintControlPrintProcessor;

if (LoadString(hInst, IDS_BANNERSIMPLE, szBuf, sizeof(szBuf)))
        pSimple = AllocSplStr(szBuf);
```

*Case 10961135-1*

24

```
     if (LoadString(hInst, IDS_BANNERFULL, szBuf, sizeof(szBuf)))
         pFull = AllocSplStr(szBuf);

return TRUE;
     }

// ---------------------------------------------------------------
     //
     // ---------------------------------------------------------------
     BOOL
     WINAPI
     WinprintEnumPrintProcessorDatatypes(
         LPTSTR  pName,
         LPTSTR  pPrintProcessorName,
         DWORD   Level,
         LPSTR   pDatatypes,
         DWORD   cbBuf,
         LPDWORD pcbNeeded,
         LPDWORD pcReturned
     )
     {
         DATATYPES_INFO_1   FAR *pInfo1 = (DATATYPES_INFO_1 FAR
     *)pDatatypes;
         LPTSTR   FAR *pMyDatatypes = Datatypes;
         DWORD    cbTotal=0;
         LPBYTE   pEnd;

*pcReturned = 0;

pEnd = (LPBYTE)pInfo1 + cbBuf;

while (*pMyDatatypes) { cbTotal + = wcslen(*pMyDatatypes)*sizeof(TCHAR) + sizeof(TCHAR) +
             sizeof(DATATYPES_INFO_1);

pMyDatatypes++;
         }

*pcbNeeded = cbTotal;

if (cbTotal <= cbBuf) { pMyDatatypes = Datatypes;

while (*pMyDatatypes) {
```

*Case 10961135-1*

25

```
        pEnd -= wcslen(*pMyDatatypes)*sizeof(TCHAR) + sizeof(TCHAR);
        wcscpy((LPTSTR)pEnd, *pMyDatatypes);
        pInfo1->pName = (LPTSTR)pEnd;
        pInfo1++;
        (*pcReturned)++;

pMyDatatypes++;
    }

} else {

SetLastError(ERROR_INSUFFICIENT_BUFFER);
    return FALSE;
    } return TRUE;
}

// ------------------------------------------------------------
//
// ------------------------------------------------------------
HANDLE
WINAPI
WinprintOpenPrintProcessor(
    LPTSTR   pPrinterName
)
{
    PPRINTPROCESSORDATA pData;
    HANDLE  hPrinter = NULL;
    HDC     hDC = 0;

/*** >> Modification to test Printer Driver Switching. Begin << ***/
/*** >> L. Snyders 8/29/96 Copyright 1996 Hewlett-Packard Company <<
***/

DWORD dwBytesNeeded = 0;  /* for Get/SetPrinters */
    DWORD dwDMBytesNeeded = 0;
    DWORD dwModeFlag = DM_OUT_BUFFER;

BOOL bRetcode = TRUE;

PRINTER_INFO_2 *pPrtInfo2 = NULL;
    char buf[256];  /* buffer for debug strings */
```

Case 10961135-1

26

```
 5      OutputDebugString("HPPRINTP: Request to Open printer:");
        OutputDebugString(pPrinterName);

/*** >> Modification to test Printer Driver Switching. End << ***/
        /* >> L. Snyders 8/29/96 << */
10 if (!OpenPrinter(pPrinterName, &hPrinter, NULL))
        {
            OutputDebugString("HPPRINTP.DLL Open Printer failed");
15          return FALSE;
        }

/*** >> Modification to test Printer Driver Switching. Begin << ***/
        /*** >> L. Snyders 8/29/96 Copyright 1996 Hewlett-Packard Company <<
20      ***/

//
        // Call GetPrinter first to get byte count needed for buffer
25      //

GetPrinter (hPrinter, 2, 0, 0, &dwBytesNeeded);
        //
        // Allocate memory for printer info buffer
30      // if (!(pPrtInfo2 = (PRINTER_INFO_2 *) AllocSplMem (dwBytesNeeded)))
        {
            OutputDebugString("HPPRINTP.DLL  AllocSplMem failed\n\r");
35          return FALSE;
        }
        //
        // GetPrinters level 2
        //
40      bRetcode = GetPrinter (hPrinter, 2, (LPBYTE)pPrtInfo2, dwBytesNeeded,
        &dwBytesNeeded);
            if (bRetcode = = FALSE)
            {
                OutputDebugString("HPPRINTP.DLL Second GetPrinter failed\n\r");
45              return FALSE;
            }
        //
        // Change the driver to the mono bitmap driver
        //
50
```

Case 10961135-1

```
 5      pPrtInfo2->pDriverName = AllocSplStr("Mono Bitmap Driver"); /* New
        Driver name */
        bRetcode = SetPrinter(hPrinter, 2, (LPBYTE)pPrtInfo2, 0);
        if (bRetcode == FALSE)
        {
10          OutputDebugString("HPPRINTP.DLL SetPrinter failed\n\r");
            return FALSE;
        }

15      //
        // Set the new driver's devmode structure, first get its size
        //
        dwDMBytesNeeded = DocumentProperties(NULL, hPrinter, pPrinterName,
            NULL, NULL, 0);
20      pDevMode = (LPDEVMODE)AllocSplMem(dwDMBytesNeeded);

//
        // Then get the default devmode values
        //
25
        bRetcode = DocumentProperties(NULL, hPrinter, pPrinterName,
                pDevMode, NULL, dwModeFlag);
        if(bRetcode < 0)
        {
30          OutputDebugString("HPPRINTP.DLL DocProp Failed\n\r");
            return(FALSE);
        }
        //
        // Now set default Devmode values in Registry
35      //
        pPrtInfo2->pDevMode = pDevMode;
        bRetcode = SetPrinter(hPrinter, 2, (LPBYTE)pPrtInfo2, 0);

/*** >> Modification to test Printer Driver Switching. End << ***/
40      /* >> L. Snyders 8/29/96 << */ pData =
        (PPRINTPROCESSORDATA)AllocSplMem(sizeof(PRINTPROCESSORDATA));
45
        pData->cb        = sizeof(PRINTPROCESSORDATA);
        pData->signature = PRINTPROCESSORDATA_SIGNATURE;
        pData->hPrinter  = hPrinter;
        pData->semPaused = CreateEvent(NULL, FALSE, TRUE, NULL);
50      pData->pPrinterName = AllocSplStr(pPrinterName);
```

*Case 10961135-1*

```
                                    28
5      return (HANDLE)pData;
       }

// ------------------------------------------------------------
10     //
       // ------------------------------------------------------------
       UINT ValidateDatatype(LPTSTR pDatatype)
       {
          LPTSTR   FAR *pMyDatatypes = Datatypes;
15        DWORD    uDatatype = 0;

while (*pMyDatatypes && wcscmp(*pMyDatatypes, pDatatype))
          {
          pMyDatatypes + +;
20        uDatatype + +;
          }
          return uDatatype;
       }

25
       // ------------------------------------------------------------
       //
       // ------------------------------------------------------------
       DWORD
30     ValidateBannerType(LPTSTR lpBanner)
       {
          if (lpBanner && *lpBanner)
          {
          if (!wcscmp(lpBanner, pFull))
35           return BANNER_FULL;
          if (!wcscmp(lpBanner, pSimple))
             return BANNER_SIMPLE;

#ifdef TIMING
40        if (!wcscmp(lpBanner, "Bench"))
          {
             hWndBench = FindWindow("BNCH32PRT", "PRTWIN");

if (hWndBench)
45           SendMessage(hWndBench, WM_USER + 801, 0, 0);

return 0;
          }
          else
50           hWndBench = 0;
       #endif
```

Case 10961135-1

```
                                    29
 5
        return BANNER_CUSTOM;
        } return 0;
10   }

// ------------------------------------------------------------------------
     //
15   // ------------------------------------------------------------------------
     BOOL
     WINAPI
     WinprintPrintDocumentOnPrintProcessor(
        HANDLE  hPrintProcessor,
20      LPPRINTPROCESSORDOCUMENTDATA    lpDoc
     )
     {
        PPRINTPROCESSORDATA pData;
        DOC_INFO_2 DocInfo;
25      DWORD   LastError = 0;
        DWORD   NoRead, NoWritten;
        DWORD   iBannerType;
        BYTE    Buffer[4096];
        HANDLE  hPrinterRead;
30      HDC hDC = NULL;
        LPBYTE pReadBuf;
        DWORD cbReadBuf;
        DWORD NoLeftOver = 0;
        BOOL ret = TRUE;
35
        if (!(pData = ValidateHandle(hPrintProcessor)))
        {
        SetLastError(ERROR_INVALID_HANDLE);
        return FALSE;
40      } pData->uDatatype = ValidateDatatype(lpDoc->pDatatype);

iBannerType = ValidateBannerType(lpDoc->pSepFile);
45
        if (iBannerType)
        InsertBannerPage(pData->hPrinter, lpDoc->JobId, lpDoc->pOutputFile,
     iBannerType, lpDoc->pSepFile);

50      DocInfo.pDocName = lpDoc->pDocumentName;
        DocInfo.pOutputFile = lpDoc->pOutputFile;   // the spool file
```

30

```
 5      DocInfo.pDatatype = lpDoc->pDatatype;
        DocInfo.JobId = lpDoc->JobId;

// open the same printer for reading the spool file.
        if (!OpenPrinter(pData->pPrinterName, &hPrinterRead, NULL))
10      return FALSE;

// This makes ReadPrinter() read the spool file for us.
        DocInfo.dwMode = DI_READ_SPOOL_JOB;
        if (!StartDocPrinter(hPrinterRead, 2, (LPBYTE)&DocInfo))
15      {
        LastError = GetLastError();
        ret = FALSE;
        goto Exit_2;
        }
20
        if (pData->uDatatype == PRINTPROCESSOR_TYPE_RAW)
        {
        // Start direct write to port
        DocInfo.dwMode = DI_CHANNEL_WRITE;
25      if (!StartDocPrinter(pData->hPrinter, 2, (LPBYTE)&DocInfo))
        {
            // SetJob(pData->hPrinter, lpDoc->JobId, 0, NULL,
        JOB_CONTROL_CANCEL);
            LastError = GetLastError();
30          ret = FALSE;
            goto Exit_1;
        }
        }

35      pReadBuf = (LPBYTE)Buffer;
        cbReadBuf = sizeof(Buffer);

// Here ReadPrinter() is used to actually read 4K of the spool file.
40      // This data is then sent either to the printer directly if RAW,
        // or to GDI if EMF. In the later case, the metafile data is played back
        // on the printer DC and then sent to the printer (all this is done by
        gdiPlaySpoolStream()).
        while (((ReadPrinter(hPrinterRead, pReadBuf, cbReadBuf, &NoRead)) &&
45      NoRead) || NoLeftOver)
        {
        // gdiPlaySpoolStream now plays one page at a time.
        // So playing back EMF gets opportunity to pause on every page.

50      if (pData->fsStatus & PRINTPROCESSOR_PAUSED)
            WaitForSingleObject(pData->semPaused, INFINITE);
```

*Case 10961135-1*

31

```
if (pData->fsStatus & PRINTPROCESSOR_ABORTED)
{
    // we can not just break for EMF
    // we need to clean up the DC and etc.

if (pData->uDatatype == PRINTPROCESSOR_TYPE_EMF)
    gdiPlaySpoolStream(NULL, NULL, lpDoc->pSpoolFileName, 0, 0, hDC);

break;
}

// check if RAW or EMF, and send it to the right place accordingly.
if (pData->uDatatype == PRINTPROCESSOR_TYPE_RAW)
    WritePrinter(pData->hPrinter, Buffer, NoRead, &NoWritten);
else
{
    NoRead += NoLeftOver;
    NoWritten = NoRead;

SetLastError(ERROR_SUCCESS);

// hDC is NULL the first time we get here
    // This is where the metafile is played back.
    hDC = gdiPlaySpoolStream(
    pData->pPrinterName, lpDoc->pOutputFile,
    Buffer, lpDoc->JobId, &NoRead, hDC);

// Upon return, NoRead is the number of bytes that are processed
    // in the previous buffer. And it must be no greater than NoWritten.

if (hDC && (NoWritten >= NoRead))
    {
    NoLeftOver = NoWritten - NoRead;

// there may be an incomplete sp block at the end that
    // wasn't processed and we need to carry over if (NoLeftOver)
        CopyMemory(Buffer, Buffer + NoRead, NoLeftOver);

pReadBuf = Buffer + NoLeftOver;
    cbReadBuf = sizeof(Buffer) - NoLeftOver;
    }
    else
    {
    // we failed
```

32

```
        // delete the ~EMF????.TMP ???
        // or do we want to leave the EMF around
        // and allow user to retry ???

LastError = GetLastError();

DBGMSG(DBG_ERROR, ("WinprintPrintDoc: gdiPlaySpoolStream failed
    %d\n", LastError));

// prompt user for retry/cancel/ok ?

gdiPlaySpoolStream(NULL, NULL, lpDoc->pSpoolFileName, 0, 0, 0);
        ret = FALSE;

break;
        }
    }
    } if (pData->uDatatype == PRINTPROCESSOR_TYPE_RAW)
        EndDocPrinter(pData->hPrinter);
Exit_1:
    EndDocPrinter(hPrinterRead);
Exit_2:
    ClosePrinter(hPrinterRead);

if (LastError)
    SetLastError(LastError);

#ifdef TIMING
    if (hWndBench)
        SendMessage(hWndBench, WM_USER + 802, 0, 0);
endif return ret;
}

// ------------------------------------------------------------------
//
// ------------------------------------------------------------------
BOOL
WINAPI
WinprintClosePrintProcessor(
    HANDLE  hPrintProcessor
    )
{
```

```
                                            33

5      PPRINTPROCESSORDATA pData;

pData = ValidateHandle(hPrintProcessor);

if (!pData)
10      {
        SetLastError(ERROR_INVALID_HANDLE);
        return FALSE;
        }

15      pData->signature = 0;

/* Release any allocated resources */ if (pData->hPrinter)
20      ClosePrinter(pData->hPrinter);

CloseHandle(pData->semPaused);

if (pData->pPrinterName)
25      FreeSplStr(pData->pPrinterName);

FreeSplMem(pData, pData->cb);

return TRUE;
30      }

// ------------------------------------------------------------
        //
35      // ------------------------------------------------------------
        BOOL
        WINAPI
        WinprintControlPrintProcessor(
            HANDLE  hPrintProcessor,
40          DWORD   Command,
            DWORD   JobID,
            LPTSTR  pDatatype,
            LPTSTR  pSpoolFile
        )
45      {
            PPRINTPROCESSORDATA pData;
            PRINTPROCESSORDATA Data;

if (hPrintProcessor)
50          pData = ValidateHandle(hPrintProcessor);
            else
```

*Case 10961135-1*

34

```
    {
    if (Command != JOB_CONTROL_CANCEL)
        return FALSE;

Data.uDatatype = ValidateDatatype(pDatatype);
    if (Data.uDatatype >= 0)
        pData = &Data;
    else
        pData = 0;
    } if (pData)
    {
    switch (Command)
    {
    case JOB_CONTROL_PAUSE:

ResetEvent(pData->semPaused);
        pData->fsStatus |= PRINTPROCESSOR_PAUSED;
        return TRUE;

case JOB_CONTROL_CANCEL:

if (!hPrintProcessor)
        {
        // we're deleting a job that hasn't started printing if (pData->uDatatype == PRINTPROCESSOR_TYPE_EMF)
            {
                return (BOOL)gdiPlaySpoolStream(NULL, NULL, pSpoolFile, 0, 0, 0);
            } return TRUE;
        } pData->fsStatus |= PRINTPROCESSOR_ABORTED;

/* fall through to release job if paused */ case JOB_CONTROL_RESUME:

if (pData->fsStatus & PRINTPROCESSOR_PAUSED)
        {
        pData->fsStatus &= ~PRINTPROCESSOR_PAUSED;
        SetEvent(pData->semPaused);
        }
```

Case 10961135-1

```
        return TRUE;

default:

break;
    }

} return FALSE;
}

// ----------------------------------------------------------------
//
// ----------------------------------------------------------------
BOOL
WINAPI
WinprintInstallPrintProcessor(
    HWND    hWnd
)
{
    return TRUE;
}

// ----------------------------------------------------------------
//
// ----------------------------------------------------------------
PPRINTPROCESSORDATA
ValidateHandle(
    HANDLE hQProc
)
{
    PPRINTPROCESSORDATA pData = (PPRINTPROCESSORDATA)hQProc;

if (pData && pData->signature == PRINTPROCESSORDATA_SIGNATURE)
        return( pData );

return( NULL );
}

/* file name: local.h    */

/*****************************************************************
 *****************
 *                                                               *
```

36

```
* THIS CODE AND INFORMATION IS PROVIDED "AS IS" WITHOUT
WARRANTY OF ANY KIND, EITHER EXPRESSED OR IMPLIED, INCLUDING BUT
NOT LIMITED TO THE IMPLIED WARRANTIES OF MERCHANTABILITY AND/OR
FITNESS FOR A PARTICULAR PURPOSE.          *
*                                                  *
* Copyright (C) 1993-95  Microsoft Corporation.  All Rights Reserved.   *
*                                                  *
*****************************************************************
****************/

// -----------------------------------------------------------
// WINPRINT
#define IDS_BANNERTITLE1      521
#define IDS_BANNERTITLE2      522
#define IDS_BANNERJOB         523
#define IDS_BANNERUSER        524
#define IDS_BANNERDATE        525
#define IDS_BANNERSIMPLE      526
#define IDS_BANNERFULL        527
// -----------------------------------------------------------

// -----------------------------------------------------------
// WINPRINT
#define IDC_STANDBAN    600
#define RT_CLIPFILE     601
// -----------------------------------------------------------

// -----------------------------------------------------------
// EXTERN VARIABLES
// ----------------------------------------------------------- extern  HANDLE   hInst;

// -----------------------------------------------------------
// DEBUG STUFF
// -----------------------------------------------------------
ifdef DEBUG extern  DWORD  SplDbgLevel;

VOID cdecl DbgMsg( LPSTR MsgFormat, ... );

/* These flags are not used as arguments to the DBGMSG macro.
 * You have to set the high word of the global variable to cause it to break.
 * It is ignored if used with DBGMSG.
```

Case 10961135-1

37

```
 *  (Here mainly for explanatory purposes.)
 */
#define DBG_BREAK_ON_WARNING    ( DBG_WARNING << 16 )
#define DBG_BREAK_ON_ERROR      ( DBG_ERROR << 16 )

#define DBG_NONE            0
#define DBG_INFO            1
#define DBG_TRACE           DBG_INFO
#define DBG_WARNING         2
#define DBG_ERROR           4

/* Double braces are needed for this one, e.g.:
 *
 *    DBGMSG( DBG_ERROR, ( "Error code %d", Error ) );
 *
 * This is because we can't use variable parameter lists in macros.
 * The statement gets pre-processed to a semi-colon in non-debug mode.
 *
 * Set the global variable GLOBAL_DEBUG_FLAGS via the debugger.
 * Setting the flag in the low word causes that level to be printed;
 * setting the high word causes a break into the debugger.
 * E.g. setting it to 0x00040006 will print out all warning and error
 * messages, and break on errors.
 */ define DBGMSG( Level, MsgAndArgs ) {if (Level >= SplDbgLevel) {DbgMsg MsgAndArgs;}}
define DBGBREAK() {DebugBreak();}
#define ASSERT( Expr, MsgAndArgs ) {if (!Expr) {DbgMsg MsgAndArgs; DebugBreak();}}
VOID SplInSem(VOID);
VOID SplOutSem(VOID);

else define DBGMSG( Level, MsgAndArgs )
define DBGBREAK()
#define ASSERT( Expr, MsgAndArgs )
#define SplInSem()
#define SplOutSem()
```

38

```
#endif

// ----------------------------------------------------------------
// FUNCTION PROTOTYPE
// ---------------------------------------------------------------- define AllocSplMem(a)      LocalAlloc( LPTR, a )
define FreeSplMem(a, b)    LocalFree( a )

LPVOID
ReallocSplMem(
    LPVOID lpOldMem,
    DWORD cbOld,
    DWORD cbNew
);

LPTSTR
AllocSplStr(
    LPTSTR lpStr
);

BOOL
FreeSplStr(
    LPTSTR lpStr
);

BOOL
ReallocSplStr(
    LPTSTR FAR *plpStr,
    LPTSTR lpStr
);

// ----------------------------------------------------------------
// UNICODE TO ANSI MACRO
// ??? !!! we should get rid of these sooner or later
// ----------------------------------------------------------------
#include <string.h>
#include <stdlib.h>
include <stdio.h> ifndef UNICODE

LPSTR
mystrstr(
    LPSTR cs,
    LPSTR ct
```

*Case 10961135-1*

39

```
      );

LPSTR
      mystrrchr(
         LPSTR cs,
         char c
      );

LPSTR
      mystrchr(
         LPSTR cs,
         char c
      );

int
      mystrnicmp(
         LPSTR cs,
         LPSTR ct,
         int n
      );

#define wcscat(a, b) lstrcat(a, b)
      #define wcscmp(a, b) lstrcmp(a, b)
      #define wcscpy(a, b) lstrcpy(a, b)
      #define wcslen(a) lstrlen(a)

#undef wcsicmp
      #define wcsicmp(a, b) lstrcmpi(a, b)

#define wcschr(a, b) mystrchr(a, b)
      #define wcsrchr(a, b) mystrrchr(a, b)
      // #define wcsncmp(a, b, c) strncmp(a, b, c)

#undef wcsnicmp
      #define wcsnicmp(a, b, c) mystrnicmp(a, b, c)

#define wcsstr(a, b) mystrstr(a, b)

#endif // UNICODE // ccteng
```

*Case 10961135-1*

What is claimed is:

1. An information distributing apparatus usable within a computer network environment, comprising:

a computer having an operating system and configured to operate within the computer network environment;

an application configured for running on the computer via the operating system, the application configured to generate a source job in the form of an intermediate file format comprising an output instruction file;

a print processor in the form of an intermediate executable code for operating on the output instruction file; and a printer having a printer driver configured to convert the output instruction file to output instructions usable by the printer for producing output;

wherein the print processor is operative to retrieve printer details for an identified printer driver name from a memory location, change the identified printer driver name to a different identified printer driver name, save the printer details of the different identified printer driver name in the form of new printer information in a system registry, retrieve printer document properties of the saved printer details from the memory device, change the retrieved printer document properties to match new printer driver settings, save the new printer document properties in the system registry, and allocate and initialize print processor data structures usable to execute a print job on the printer.

2. The information distributing apparatus of claim 1 wherein the output instruction file comprises a drawing instruction file containing drawing instructions.

3. The information distributing apparatus of claim 1 wherein the print driver receives the intermediate file format of output instructions to process the instructions.

4. The information distributing apparatus of claim 1 wherein the intermediate file format of output instructions comprises an enhanced metafile.

5. The information distributing apparatus of claim 1 wherein the print processor feeds the output instruction file via a serial send to the printer driver of the printer enabling rendering of the output instruction file to multiple output devices.

6. The information distributing apparatus of claim 1 wherein the print processor feeds the output instruction file via an interleaved send to the printer driver of the printer to render the output instruction file to multiple output devices.

7. The information distributing apparatus of claim 1 wherein the print processor feeds the output instruction file via a multiple thread in parallel send to the printer driver of the printer to render the output instruction file to multiple output devices.

8. The information distributing apparatus of claim 1 further comprising a registry and a system application programming interface (API), the registry operating through the application programming interface (API) on the print processor to configure the printer to receive the output instruction file.

9. The information distributing apparatus of claim 1 further comprising a memory device and a spooler for taking and storing the application generated output instruction file.

10. The information distributing apparatus of claim 9 further comprising a graphics device interface (GDI) for implementing graphical functions and dynamically linking a system graphical application program interface (API) with the printer driver of the printer, the memory device, and an original printer driver used to generate the output instruction file.

11. The information distributing apparatus of claim 9 further comprising a spool header generated by the spooler and assigned to the output instruction file, the spool header comprising a spool job header file for describing the destinations and rendered data and/or encoded data for each destination for the application generated output instruction file.

12. The information distributing apparatus of claim 11 wherein the output instruction file comprises an enhanced metafile, the print processor copies the original copy of the enhanced metafile into the memory device after the print processor initiates a print document responsive to the spooler, and a feedback loop initiates multiple print document tasks comprising multiple pass jobs for distribution.

13. An information distributing apparatus usable within a computer network environment, comprising:

a computer having an operating system and configured to operate within the computer network environment;

an application configured for running on the computer via the operating system, the application configured to generate an enhanced metafile;

a print processor in the form of an intermediate executable code for operating on the enhanced metafile; and at least one output device having an output device driver configured to convert the enhanced metafile to output instructions usable by the output device for producing output;

wherein the print processor is operative to retrieve output device details for an identified device driver name from a memory location, change the identified device driver name to a different identified device driver name, save the output device details of the different identified device driver name in the form of new output device information in a system registry, retrieve output device document properties of the saved output device details from the memory device, change the retrieved output device document properties to match new device driver settings, save the new output device document properties in the system registry, and allocate and initialize print processor data structures usable to execute an output job on the output device.

14. The information distributing apparatus of claim 13 further comprising a registry and a system application programming interface (API), the registry operating through the application programming interface (API) on the print processor to configure the at least one output device to receive the enhanced metafile.

15. The information distributing apparatus of claim 13 further comprising a memory device and a spooler for taking and storing the application generated enhanced metafile.

16. The information distributing apparatus of claim 15 further comprising a graphics device interface (GDI) for implementing graphical functions and dynamically linking a system graphical application program interface (API) with the output device driver of the at least one output device, the memory device, and an original device driver used to generate the enhanced metafile.

17. The information distributing apparatus of claim 15 further comprising a spool header generated by the spooler and assigned to the enhanced metafile, the spool header comprising a spool job header file for describing the destinations and rendered data and/or encoded data for each destination for the application generated enhanced metafile.

18. In a system for distributing print jobs from a computer usable for operating in a computer network environment of the type having an operating system; an application configured for running on the operating system and generating a source job comprising an output instruction file; and a printer having a printer driver for receiving the output instruction file for producing output, a method comprising the steps of:

provided a print processor in the form of an intermediate executable for operating on the output instruction file;

retrieving printer details for an identified printer driver name from a memory location in a memory device of the computer;

changing the identified printer driver name to a different identified printer driver name;

saving the printer details of the different identified printer driver name in the form of new printer information in a system registry;

retrieving printer document properties of the saved printer details from the memory device;

changing the retrieved printer document properties to match new printer driver settings;

saving the new printer document properties in the system registry; and allocating and initializing print processor data structures usable to execute a print job on the printer.

19. In the system of claim 18, following initializing the print processor data structures, the improvement further comprising the step of returning to a spooler for reinitializing the system to re-execute another print job via the aforementioned steps to execute multiple pass print jobs for distribution.

20. In the system and according to the improved method of claim 18 wherein the output instruction file is embodied in the form of an enhanced metafile, the method further including the step of providing a spooler for taking and storing the enhanced metafile from an application, generating a spool header via by the spooler and assigning the spool header to the enhanced metafile, the spool header comprising a spool job header file for describing the destinations and rendered data and/or encoded data for each destination for the application generated enhanced metafile.

* * * * *